US009779527B2

(12) United States Patent
Tang et al.

(10) Patent No.: US 9,779,527 B2
(45) Date of Patent: Oct. 3, 2017

(54) METHOD, TERMINAL DEVICE AND STORAGE MEDIUM FOR PROCESSING IMAGE

(71) Applicant: Xiaomi Inc., Beijing (CN)

(72) Inventors: Mingyong Tang, Beijing (CN); Bo Zhang, Beijing (CN); Zhinong Zhou, Beijing (CN)

(73) Assignee: XIAOMI INC., Beijing (CN)

( * ) Notice: Subject to any disclaimer, the term of this patent is extended or adjusted under 35 U.S.C. 154(b) by 0 days.

(21) Appl. No.: 14/287,196

(22) Filed: May 27, 2014

(65) Prior Publication Data
US 2015/0049924 A1 Feb. 19, 2015

Related U.S. Application Data

(63) Continuation of application No. PCT/CN2014/072373, filed on Feb. 21, 2014.

(30) Foreign Application Priority Data

Aug. 15, 2013 (CN) .......................... 2013 1 0357087

(51) Int. Cl.
*G06K 9/00* (2006.01)
*G06T 11/60* (2006.01)

(52) U.S. Cl.
CPC .......... *G06T 11/60* (2013.01); *G06K 9/00221* (2013.01); *G06K 2009/00322* (2013.01)

(58) Field of Classification Search
None
See application file for complete search history.

(56) References Cited

U.S. PATENT DOCUMENTS

2003/0022362 A1 1/2003 Kirk et al.
2006/0008173 A1 1/2006 Matsugu et al.
(Continued)

FOREIGN PATENT DOCUMENTS

CN 1475969 A 2/2004
CN 1522048 A 8/2004
(Continued)

OTHER PUBLICATIONS

Florea, Corneliu, Capata, Adrian, Ciuc, Mihai, Corcoran, Peter. "Facial Enhancement and Beautification for HD Video Cameras" 2011 IEEE International Conference on Consumer Electronics.*
(Continued)

*Primary Examiner* — Kim Vu
*Assistant Examiner* — Molly Delaney
(74) *Attorney, Agent, or Firm* — Jun He Law Offices P.C.; James J. Zhu

(57) ABSTRACT

The present disclosure discloses a method and a terminal device for processing an image. The method includes: acquiring an image; recognizing a face contained in the image; acquiring information of character features according to the face in the image; processing the image according to the information of character features; and obtaining the processed image. In the embodiments of the present disclosure, by automatically recognizing the face in the image, and acquiring the information of character features thereby acquiring a cosmetic process mode corresponding to the information of character features, and then processing the image according to the selected cosmetic process mode, manual setting of cosmetic process parameters can be avoided and the efficiency of image processing can be improved.

17 Claims, 10 Drawing Sheets

(56) References Cited

U.S. PATENT DOCUMENTS

| | | | | |
|---|---|---|---|---|
| 2006/0228040 | A1* | 10/2006 | Simon | G06K 9/00234 382/254 |
| 2007/0223830 | A1* | 9/2007 | Ono | 382/254 |
| 2008/0002892 | A1* | 1/2008 | Jelonek et al. | 382/224 |
| 2009/0185723 | A1* | 7/2009 | Kurtz et al. | 382/118 |
| 2009/0273667 | A1 | 11/2009 | Nozaki et al. | |
| 2011/0000714 | A1 | 1/2011 | Durairajan et al. | |
| 2011/0135168 | A1* | 6/2011 | Hosoi | G06K 9/00288 382/118 |
| 2012/0243742 | A1* | 9/2012 | Sato et al. | 382/103 |
| 2013/0050395 | A1* | 2/2013 | Paoletti | H04N 7/142 348/14.02 |

FOREIGN PATENT DOCUMENTS

| | | |
|---|---|---|
| CN | 101247482 A | 8/2008 |
| CN | 103413270 A | 11/2013 |
| JP | 2004246456 A | 9/2004 |
| JP | 2006-012062 A | 1/2006 |
| JP | 2006012062 A | 1/2006 |
| JP | 2007280291 A | 10/2007 |
| JP | 2008234342 A | 10/2008 |
| JP | 2010086379 A | 4/2010 |
| JP | 2010171841 A | 8/2010 |
| JP | 2012141475 A | 7/2012 |
| JP | 2012198781 A | 10/2012 |
| KR | 20100098122 A | 9/2010 |
| KR | 20130082980 A | 7/2013 |
| RU | 2381553 C1 | 2/2010 |

OTHER PUBLICATIONS

"International Search Report for PCT/CN2014/072373".
Hiroshi Kano, "Digital Image Processing"; Ohmsha, Ltd, Apr. 20, 2011; p. 45-51, 70-76.

* cited by examiner

SUBSTITUTE DRAWINGS

METHOD, TERMINAL DEVICE AND STORAGE MEDIUM FOR PROCESSING IMAGE

CROSS REFERENCE TO RELATED APPLICATIONS

This application is a Continuation of International Application No. PCT/CN2014/072373 with an international filing date of Feb. 21, 2014, which is based upon and claims priority to the Chinese Patent Application No. CN201310357087.3, filed on Aug. 15, 2013, the entire contents of which are incorporated herein by reference.

TECHNICAL FIELD

The present disclosure relates to the technical field of data processing, and more particularly, to a method, a terminal device and a storage medium for processing an image.

BACKGROUND

As cameras and other mobile terminals with a camera have become popular, it has become increasingly convenient for people to take pictures. Accordingly, the number of pictures taken has increasing. Normally, a picture, after being taken, can be cosmetically processed and then sent to a social media platform such as a blog, a micro blog, an individual web space to be shared with friends and family members.

Currently, methods for performing a cosmetic process on a picture with one press of a key have been proposed, which provide seven options of cosmetic processes, including whitening, freckle removing, slimming, under-eye dark circle removing, eye beautifying, eye brightening and special cosmetic effects.

SUMMARY

Embodiments of the disclosure provide a method, a terminal device and a storage medium for processing an image, which are capable of automatically matching a corresponding cosmetic process mode and improving the efficiency.

According to a first aspect of the embodiments of the present disclosure, there is provided a method for processing an image, comprising: acquiring the image; recognizing a face contained in the image; acquiring information of character features according to the face in the image; processing the image according to the information of character features; and obtaining a processed image.

According to a second aspect of the embodiments of the present disclosure, there is provided a terminal device for processing an image, comprising: a processor; and a memory for storing instructions executable by the processor, for performing a method comprising: acquiring the image; recognizing a face contained in the image; acquiring information of character features according to the face in the image; processing the image according to the information of character features; and obtaining a processed image According to a third aspect of the embodiments of the present disclosure, there is provided a non-transitory computer-readable storage medium having stored therein instructions that, when executed by a processor of a terminal device, causes the terminal device to perform a method for processing an image, the method comprising: acquiring the image; recognizing a face contained in the image; acquiring information of character features according to the face in the image; processing the image according to the information of character features; and obtaining the processed image.

The technical solutions provided by the embodiments of the present disclosure may have the following advantageous effects. In the embodiments of the present disclosure, by automatically recognizing a face in an image, acquiring information of character features, matching a cosmetic process mode corresponding to the information of character features, and processing the image with the matched cosmetic process mode, manual setting for cosmetic process parameters will be avoided and the efficiency will be improved.

Other features and advantages of the disclosure will be set forth in the following description. Moreover, they will become more apparent partly from the description, or be understood by implementing the disclosure. The objects and other advantages of the disclosure may be realized and achieved by structures particularly specified in the written description, the claims and the accompanied drawings.

It should be understood that, the general description above and the detailed description below are merely illustrative and explanatory, which do not limit the present disclosure.

Hereinafter, a further detailed description will be given to the technical solutions of the disclosure with reference to the accompanied drawings and the embodiments.

BRIEF DESCRIPTION OF THE DRAWINGS

The accompanying drawings which constitute a part of the specification and serve to explain the present disclosure together with the embodiments thereof, are provided for better understanding of the present disclosure, and by no means constitute a limitation to the present disclosure, in which.

DETAILED DESCRIPTION

Hereinafter, embodiments of the present disclosure will be described in conjunction with the accompanying drawings. It should be understood that the embodiments described herein are used merely to illustrate and explain rather than to limit the present disclosure.

Currently, in order to perform a cosmetic process to a picture, a user needs to manually select a cosmetic process option and cosmetic process parameters for each function he wishes to use, which is unintelligent and inefficient. While in the embodiments of the present disclosure, it is capable of automatically acquiring a corresponding cosmetic process mode, thereby manual setting of cosmetic process parameters will be avoided and the image processing efficiency will be improved.

Figure 1:
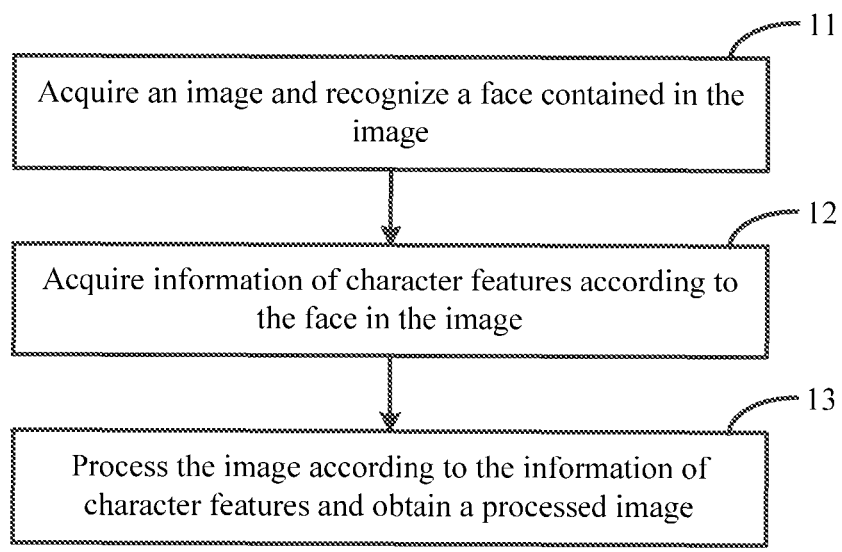
FIG. 1 is a flowchart showing a main method for processing an image according to an exemplary embodiment.

FIG. 1 shows a flowchart of a method for processing an image according to an embodiment of the present disclosure, which includes the following steps 11-15.

Step 11 includes acquiring the image.

Step 12 includes recognizing a face contained in the image.

In one embodiment, the image acquired may be the image captured by a camera, or may be the image selected from a picture library, so as to meet users' various demands. In this case, when the image is the image captured by a front camera, the method may include additional steps of detecting at all time whether the front camera is turned on before acquiring the image captured by the front camera, and if the front camera is detected as turned on, automatically acquiring the image captured by the front camera.

Facial recognition can be performed by analyzing and comparing information on visual features of the face, which belongs to a biology recognition technology that distinguishes individuals according to biological features of the individuals (generally human beings) themselves. Currently, the facial recognition technology has been applied in many fields, for example, a technology of automatic focusing on faces and smile shuttering for a digital camera, security and management for enterprises and residences, access control systems, systems with monitoring cameras, etc. The conventional facial recognition algorithms include: feature-based recognition algorithms, appearance-based recognition algorithms, template-based recognition algorithms, recognition algorithms using neural network, etc.

Step 13 includes acquiring information of character features according to the face in the image.

In one embodiment, the information of character features may include an identity, an age or a gender of a person, etc.

For example, a corresponding relationship between identities, ages or genders of persons and faces is stored in a database in advance, and then the identity, the age or the gender of the person having his/her face in the image will be acquired by matching the face in the image with the face in the database.

Step 14 includes processing the image according to the information of character features.

Lastly, step 15 includes obtaining a processed image.

Depending on the different information of character features, processing the image according to the information of character features in the above step 14 may have different processing approaches, which will be described in detail hereinafter.

A First Approach

When the information of character features is the identity of a person, processing the image according to the information of character features in the above step 14 may include the following steps A1-A2.

Step A1 includes acquiring a preset cosmetic process mode corresponding to the identity of the person.

Step A2 includes processing the image with the cosmetic process mode corresponding to the identity of the person.

A Second Approach

When the information of character features is the age and the gender of a person, processing the image according to the information of character features in the above step 14 may include the following steps B1-B2.

Step B1 includes acquiring a preset cosmetic process mode corresponding to the age and the gender of the person.

Step B2 includes processing the image with the cosmetic process mode corresponding to the age and the gender of the person.

A Third Approach

When the information of character features is the age of a person, processing the image according to the information of character features in the above step 14 may include the following steps C1-C2.

Step C1 includes acquiring a preset cosmetic process mode corresponding to the age of the person.

Step C2 includes processing the image with the cosmetic process mode corresponding to the age of the person.

A Fourth Approach

When the information of character features is the gender of a person, processing the image according to the information of character features in the above step 14 may include the following steps D1-D2.

Step D1 includes acquiring a preset cosmetic process mode corresponding to the gender of the person.

Step D2 includes processing the image with the cosmetic process mode corresponding to the gender of the person.

A Fifth Approach

When the image contains a plurality of faces, the above step 13 may include the following step E, and processing the image according to the information of character features in the above step 14 may include the following steps F1-F2.

Step E includes acquiring the age and the gender of a person for each of the plurality of faces respectively according to each of the plurality of faces in the image.

Step F1 includes acquiring a preset cosmetic process mode corresponding to the age and the gender of the person for each of the plurality of faces.

Step F2 includes processing each of the plurality of faces with the cosmetic process mode corresponding to the age and the gender of the person for each of the plurality of faces.

In the above first through fifth approaches, a corresponding cosmetic process mode may be matched according to the identity, the age and the gender of the person, and the image may be processed with the corresponding cosmetic process mode, so as to meet various users' demands. Moreover, when the image contains a plurality of faces, a corresponding cosmetic process mode may be matched for each face, and each face may be processed with the respective cosmetic process mode.

In one embodiment, the preset cosmetic process mode may include: a preset cosmetic process option and a cosmetic process level regarding the cosmetic process option. For example, the preset cosmetic process option may include: whitening, freckle removing, slimming, under-eye dark circle removing, eye beautifying, eye brightening or special cosmetic effects, etc. For example, four levels including level 0 through level 3 are set as the cosmetic process levels, in which level 0 represents no cosmetic process, level 1 represents slight cosmetic process, level 2 represents moderate cosmetic process and level 3 represents deep cosmetic process. The preset cosmetic process options includes the above seven cosmetic process options, i.e., whitening, freckle removing, slimming, under-eye dark circle removing, eye beautifying, eye brightening and special cosmetic effects. Thus, a cosmetic process mode 2222222 represents moderate whitening, moderate freckle removing, moderate slimming, moderate under-eye dark circle removing, moderate eye beautifying, moderate eye brightening and moderate special cosmetic effects.

In addition, in one embodiment, processing the image according to the information of character features in the above step 14 may further includes the following steps G1-G2.

Step G1 includes marking the face in the image with a preset figure.

Step G2 includes displaying a nickname corresponding to the information of character features at a side of the preset figure.

For example, the face in the image may be marked with a box, and a respective nickname may be displayed on the upper side of the box according to the age and the gender of the person. For example, the nickname may be "lovely little boy", "lovely little girl", "handsome guy", "beautiful lady" or "handsome old man", etc. Thus, a respective nickname may be automatically displayed on the upper side of the box according to the age and the gender of the person, so as to enrich the user's experience.

In this embodiment of the present disclosure, by automatically recognizing the face in the image, and acquiring the information of character features thereby acquiring a cosmetic process mode corresponding to the information of character features, and then processing the image according to the selected cosmetic process mode, manual setting of cosmetic process parameters can be avoided and the efficiency of image processing can be improved.

It should be noted that, in practical applications, all the above optional embodiments may be combined arbitrarily to form optional embodiments of the present disclosure, which will not be redundantly described herein.

Hereinafter, technical solutions according to the embodiments of the present disclosure will be described in detail through four embodiments.

Figure 2A:
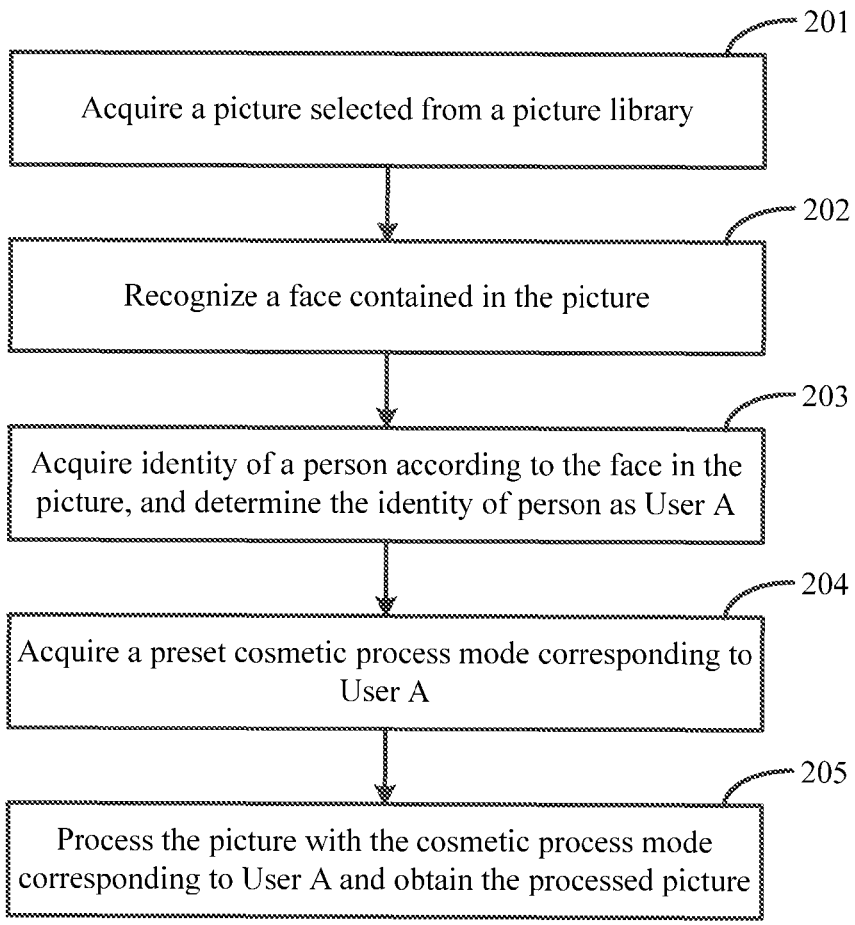
FIG. 2A is a flowchart showing a method for processing an image according to the first embodiment.

FIG. 2A shows a flowchart of a method for processing an image according to a first embodiment, which may be applied in a situation where after a picture selected from a picture library is acquired, a face in the picture is recognized, and User A who is the owner of the terminal device is recognized as the face in the picture and has preset a cosmetic process mode for himself, then a cosmetic process is performed on the picture according to the preset cosmetic process mode. Of course, User A may not be the owner of the terminal device, and similarly, a cosmetic process mode for User A may be preset, and a cosmetic process may be performed on the picture according to the preset cosmetic process mode. The method includes the following steps.

Step 201 includes acquiring a picture selected from a picture library.

Step 202 includes recognizing a face contained in the picture.

Step 203 includes acquiring an identity of a person according to the face in the picture and determining the identity of the person as User A.

Step 204 includes acquiring a preset cosmetic process mode corresponding to User A.

Figure 2B:
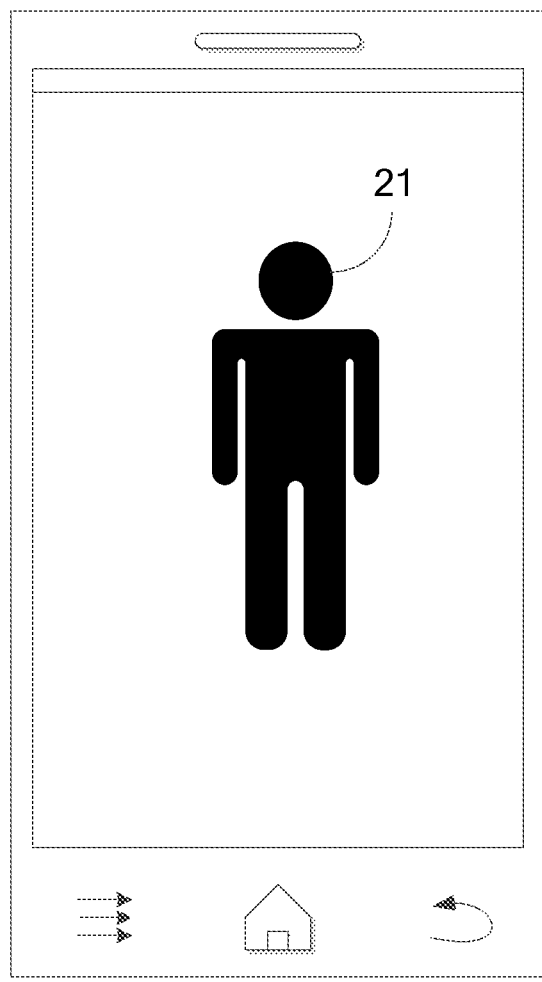
FIG. 2B illustrates an exemplary display showing the recognition of a face in a picture according to an embodiment of the present disclosure.

As shown in FIG. 2B, a reference number 21 represents the face in the picture, according to which an identity of a person is acquired and determined as User A.

The preset cosmetic process mode may include: a preset cosmetic process option and a cosmetic process level regarding the cosmetic process option. For example, the preset cosmetic process option may include: whitening, freckle removing, slimming, under-eye dark circle removing, eye beautifying, eye brightening or special cosmetic effects, etc. For example, four levels including level 0 through level 3 are set as the cosmetic process levels, in which level 0 represents no cosmetic process, level 1 represents slight cosmetic process, level 2 represents moderate cosmetic process and level 3 represents deep cosmetic process. The preset cosmetic process options are the above seven cosmetic process options, i.e., whitening, freckle removing, slimming, under-eye dark circle removing, eye beautifying, eye brightening and special cosmetic effects. For example, User A has preset the cosmetic process mode for himself as 2210230, which represents moderate whitening, moderate freckle removing, slight slimming, no under-eye dark circle removing, moderate eye beautifying, deep eye brightening and no special cosmetic effects.

Step 205 includes processing the picture with the cosmetic process mode corresponding to User A and obtaining a processed picture.

In the first embodiment of the present disclosure, by automatically recognizing the face in the image, and acquiring the information of character features thereby acquiring a cosmetic process mode corresponding to the information of character features, and then processing the image according to the selected cosmetic process mode, manual setting of cosmetic process parameters can be avoided and the efficiency of image processing can be improved.

Figure 3:
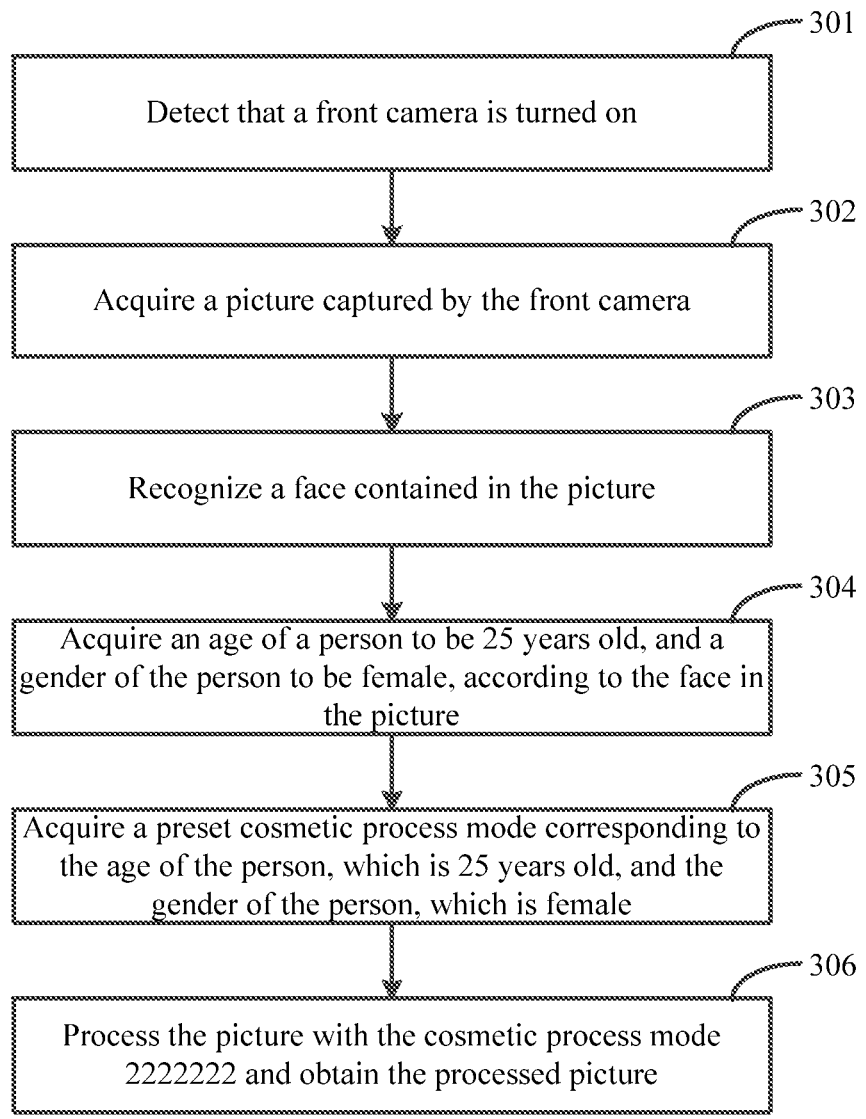
FIG. 3 is a flowchart showing a method for processing an image according to the second embodiment of the present disclosure.

FIG. 3 shows a flowchart of a method for processing an image according to a second embodiment, which may be applied in a situation where after a picture is acquired by a user photographing himself, a face in the picture is recognized, and then an age and a gender of a person having the face in the picture are recognized, and a preset cosmetic process mode corresponding to the age and the gender may be automatically acquired.

The preset cosmetic process modes corresponding to the age and the gender are shown in the following TABLE 1 which includes seven cosmetic process options that are whitening, freckle removing, slimming, under-eye dark circle removing, eye beautifying, eye brightening and special cosmetic effects in the above order. The cosmetic process options are set to have four levels including level 0 through level 3 for cosmetic process, in which level 0 represents no cosmetic process, level 1 represents slight cosmetic process, level 2 represents moderate cosmetic process and level 3 represents deep cosmetic process. For example, a cosmetic process mode 2222222 represents moderate whitening, moderate freckle removing, moderate slimming, moderate under-eye dark circle removing, moderate eye beautifying, moderate eye brightening and moderate special cosmetic effects. Of course, the preset cosmetic process modes corresponding to the age and the gender are not limited to those shown in TABLE 1, and other cosmetic process modes corresponding to the age and the gender may be set, which will not be redundantly described herein.

TABLE 1

COSMETIC PROCESS MODES CORRESPONDING TO AGE AND GENDER

| Age | Gender | |
|---|---|---|
| | Male | Female |
| 0-2 years old | 0000000 | 0000000 |
| 3-7 years old | 0000111 | 0000111 |
| 7-17 years old | 0100111 | 1100111 |
| 18-30 years old | 1311222 | 2222222 |
| 30-44 years old | 2232222 | 3333333 |
| 45-60 years old | 2132222 | 2223222 |
| >60 years old | 1000000 | 1000000 |

In one embodiment, the method includes the following steps.

Step 301 includes detecting that a front camera is turned on.

Step 302 includes acquiring a picture captured by the front camera.

Step 303 includes recognizing a face contained in the picture.

Step 304 includes acquiring an age of a person to be 25 years old, and a gender of the person to be female, according to the face in the picture.

Step 305 includes acquiring a preset cosmetic process mode corresponding to the age of the person, which is 25 years old, and the gender of the person, which is female.

For example, by comparing the cosmetic process mode with the age of the person, which is 25 years old, and the gender of the person, which is female, in TABLE 1, the cosmetic process mode of 2222222 is acquired, which represents moderate whitening, moderate freckle removing, moderate slimming, moderate under-eye dark circle removing, moderate eye beautifying, moderate eye brightening and moderate special cosmetic effects.

Step 306 includes processing the picture with the cosmetic process mode 2222222 and obtaining a processed picture.

In the above step 306, in addition to process the picture with the cosmetic process mode 2222222, the face in the picture may further be marked with a preset figure (e.g., a box, a circle, etc.), and a nickname corresponding to the age of the person, which is 25 years old, and the gender of the person, which is female. For example, "neighbor girl", "smart girl", etc., may be displayed at a side of the preset figure.

In the second embodiment of the present disclosure, by automatically recognizing the face in the image, and acquiring the information of character features thereby acquiring a cosmetic process mode corresponding to the information of character features, and then processing the image according to the selected cosmetic process mode, manual setting of cosmetic process parameters can be avoided and the efficiency of image processing can be improved.

Figure 4:
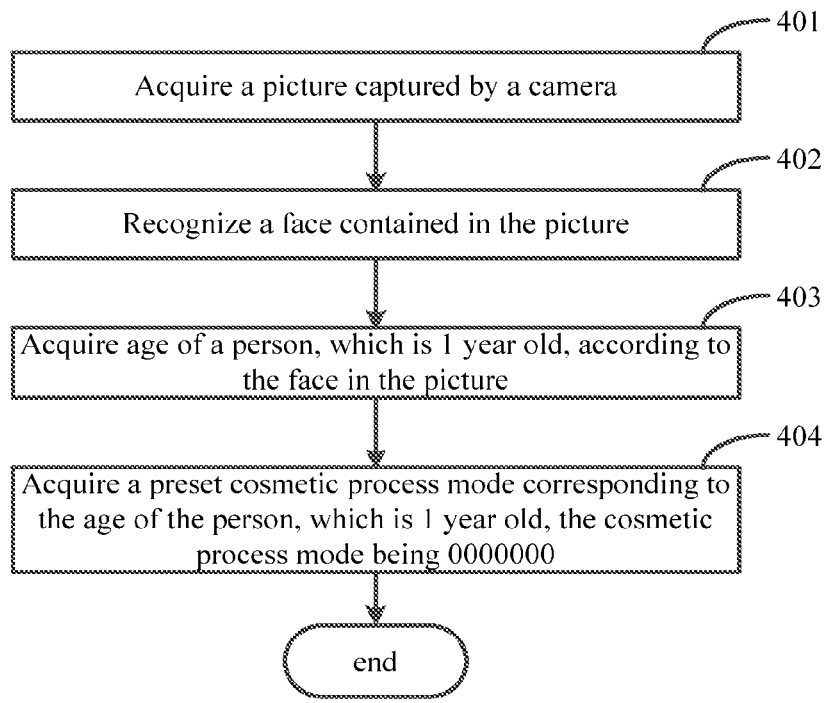
FIG. 4 is a flowchart showing a method for processing an image according to the third embodiment of the present disclosure.

FIG. 4 shows a flowchart of a method for processing an image according to a third embodiment, which may be applied in a situation where after a picture captured by a user is acquired, a face in the picture is recognized, a person with the face in the picture is recognized as a 0-2 year old baby, then no cosmetic process is performed regardless the gender. The method includes the following steps.

Step 401 includes acquiring a picture captured by a camera.

Step 402 includes recognizing a face contained in the picture.

Step 403 includes acquiring an age of a person, which is 1 year old according to the face in the picture.

Step 404 includes acquiring a preset cosmetic process mode corresponding to the age of the person, which is 1 year old, where the cosmetic process mode being 0000000, and no cosmetic process is needed. Then the procedure is terminated.

In the third embodiment of the present disclosure, by automatically recognizing the face in the image, and acquiring the information of character features thereby acquiring a cosmetic process mode corresponding to the information of character features, and then processing the image according to the selected cosmetic process mode, manual setting of cosmetic process parameters can be avoided and the efficiency of image processing can be improved.

Figure 5A:
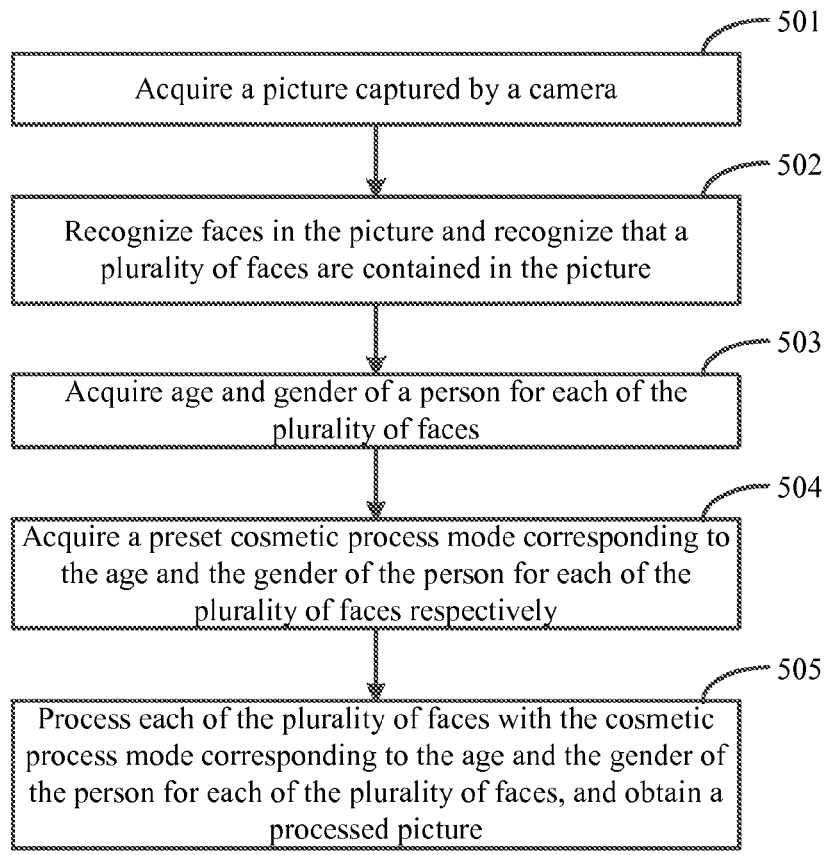
FIG. 5A is a flowchart showing a method for processing an image according to the fourth embodiment of the present disclosure.

FIG. 5A shows a flowchart of a method for processing an image according to a fourth embodiment, which may be applied in a situation where after a picture captured by the user is acquired, faces in the picture are recognized and a plurality of faces contained in the picture are recognized, an age and a gender of the person for each of the plurality of faces are recognized, a preset cosmetic process mode corresponding to the age and the gender of the person for each of the plurality of faces is acquired, and each of the plurality of faces is processed with the corresponding cosmetic process mode respectively. The method includes the following steps.

Step 501 includes acquiring a picture captured by a camera.

Step 502 includes recognizing faces in the picture, which contains a plurality of faces.

Step 503 includes acquiring an age and a gender of a person for each of the plurality of faces.

Step 504 includes acquiring a preset cosmetic process mode corresponding to the age and the gender of the person for each of the plurality of faces respectively.

Step 505 includes processing each of the plurality of faces with the cosmetic process mode corresponding to the age and the gender of the person for each of the plurality of faces, and obtaining a processed picture.

For example, three faces contained in the picture are recognized. The ages and genders of the three persons having the faces are respectively: a 2-5 year old male, an 18-30 year old male and an over 60 years old male. According to the cosmetic process modes corresponding to the age and the gender in TABLE 1, the cosmetic process modes for the three faces are respectively: 0000111, 1311222 and 1000000. Then, each of the faces may be cosmetically processed with the respective cosmetic process mode.

Figure 5B:
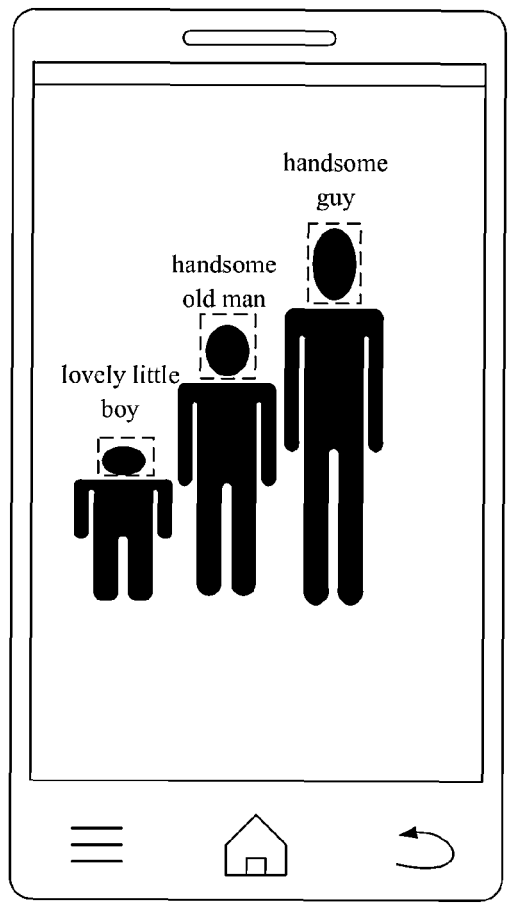
FIG. 5B illustrates an exemplary display showing an effect of a picture after processed according to an embodiment of the present disclosure.

In the above step 505, in addition to processing each of the faces with the cosmetic process mode corresponding to the age and the gender of the person for each of the faces, each of the faces in the picture may also be marked with a preset figure (e.g., a box, a circle, etc.), and a nickname corresponding to the age and the gender of the person for each of the faces may be displayed at a side of the preset figure. For example, as shown in FIG. 5B, the nicknames displayed at the side of the preset figure marked above the three faces are be respectively "lovely little boy", "handsome guy" and "handsome old man".

In the fourth embodiment of the present disclosure, by automatically recognizing the face in the image, and acquiring the information of character features thereby acquiring a cosmetic process mode corresponding to the information of character features, and then processing the image according to the selected cosmetic process mode, manual setting of cosmetic process parameters can be avoided and the efficiency of image processing can be improved.

The procedures implementing the method for processing the image have been described as above. The procedures may be implemented by an apparatus, an internal function and structure of which are described in the following.

Figure 6:
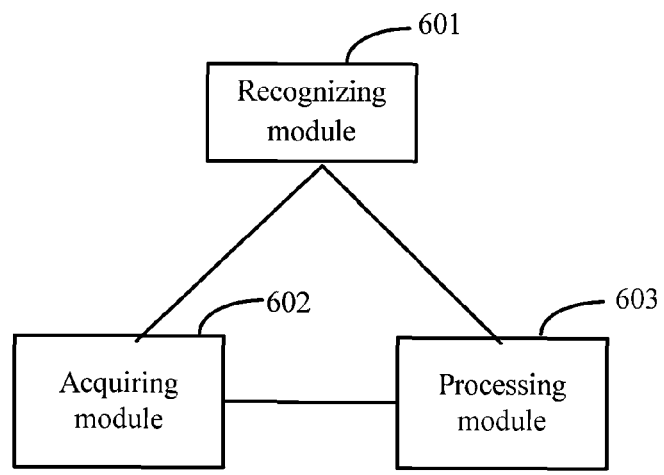
FIG. 6 illustrates an exemplary display showing a main structure of an apparatus for processing an image according to an embodiment of the present disclosure.

As shown in FIG. 6, based on the same disclosed concept, an apparatus for processing an image according to an embodiment includes a recognizing module 601, an acquiring module 602 and a processing module 603.

The recognizing module 601 is configured to acquire an image and recognize a face contained in the image.

The acquiring module 602 is configured to acquire information of character features according to the face in the image.

The processing module 603 is configured to process the image according to the information on character features and obtain a processed image.

Figure 7:
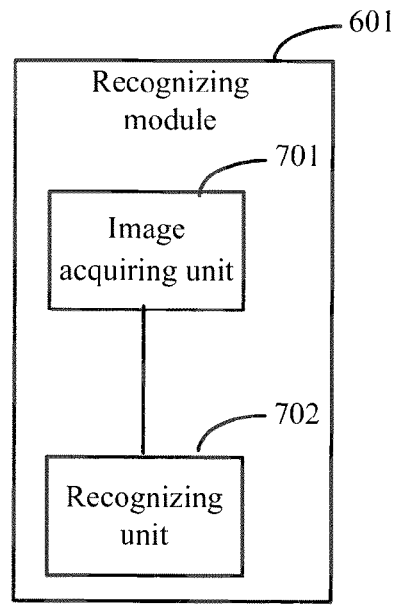
FIG. 7 illustrates an exemplary display showing a detailed structure of an recognizing module of an apparatus for processing an image according to an embodiment of the present disclosure.

In one embodiment, as shown in FIG. 7, the above recognizing module 601 may include: an image acquiring unit 701, configured to acquire an image captured by a camera or acquire an image selected from a picture library; and a recognizing unit 702, configured to recognize a face contained in the image.

Figure 8:
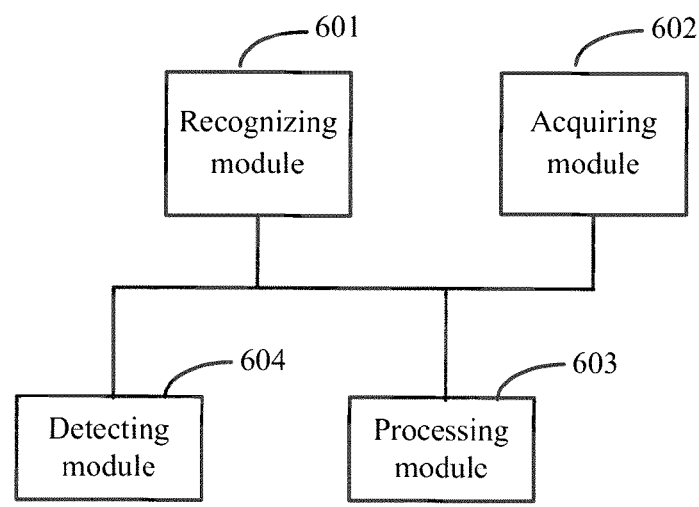
FIG. 8 illustrates an exemplary display showing a detailed structure of an apparatus for processing an image according to an embodiment of the present disclosure.

In one embodiment, as shown in FIG. 8, the apparatus illustrated in FIG. 6 may further include: a detecting module 604 configured to detect whether the front camera is turned on before an image captured by the front camera is acquired by the image acquiring unit 701, when the camera is a front camera.

In one embodiment, the information of character features may include an identity, an age or a gender of a person, etc.

Figure 9:
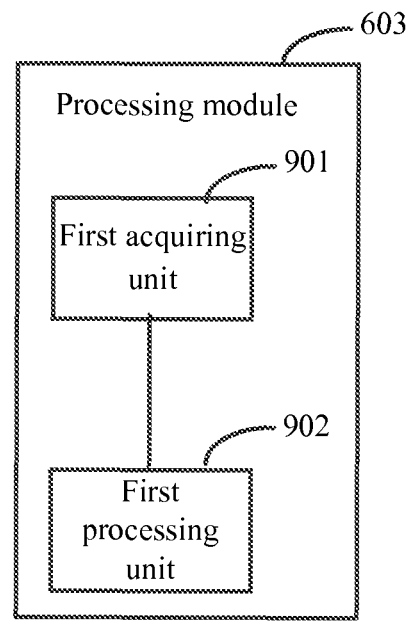
FIG. 9 illustrates an exemplary display showing a first detailed structure of a processing module of an apparatus for processing an image according to an embodiment of the present disclosure.

In one embodiment, as shown in FIG. 9, the above processing module 603 may include: a first acquiring unit 901 configured to acquire a preset cosmetic process mode corresponding to the identity of a person, when the information of character features is the identity of the person; and a first processing unit 902 configured to process the image with the cosmetic process mode corresponding to the identity of the person, and obtain a processed image.

Figure 10:
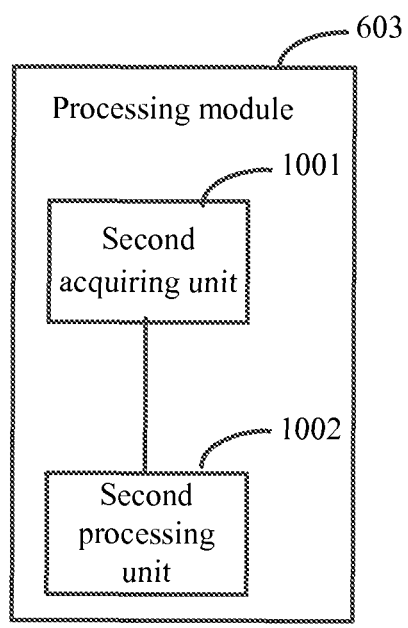
FIG. 10 illustrates an exemplary display showing a second detailed structure of a processing module of an apparatus for processing an image according to an embodiment of the present disclosure.

Alternatively, in one embodiment, as shown in FIG. 10, the above processing module 603 may include: a second acquiring unit 1001 configured to acquire a preset cosmetic process mode corresponding to the age and the gender of a person, when the information of character features is the age and the gender of the person; and a second processing unit 1002 configured to process the image with the cosmetic process mode corresponding to the age and the gender of the person, and obtain a processed image.

Figure 11:
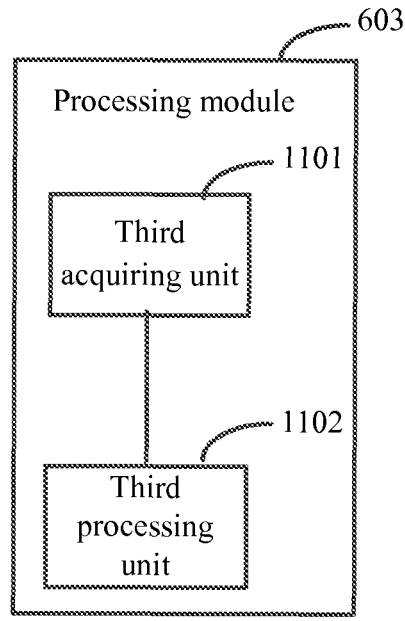
FIG. 11 illustrates an exemplary display showing a third detailed structure of a processing module of an apparatus for processing an image according to an embodiment of the present disclosure.

Alternatively, in one embodiment, as shown in FIG. 11, the above processing module 603 may include: a third acquiring unit 1101 configured to acquire a preset cosmetic process mode corresponding to the age of a person, when the information of character features is the age of the person; and a third processing unit 1102 configured to process the image with the cosmetic process mode corresponding to the age of the person, and obtain a processed image.

Figure 12:
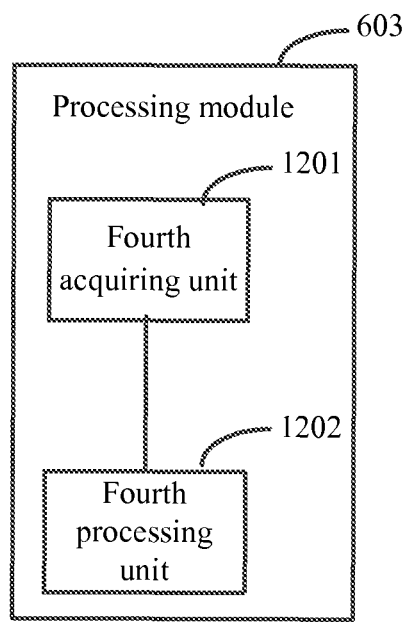
FIG. 12 illustrates an exemplary display showing a fourth detailed structure of a processing module of an apparatus for processing an image according to an embodiment of the present disclosure.

Alternatively, in one embodiment, as shown in FIG. 12, the above processing module 603 may include: a fourth acquiring unit 1201 configured to acquire a preset cosmetic process mode corresponding to the gender of a person, when the information of character features is the gender of the person; and a fourth processing unit 1202 configured to process the image with the cosmetic process mode corresponding to the gender of the person, and obtain a processed image.

Figure 13:
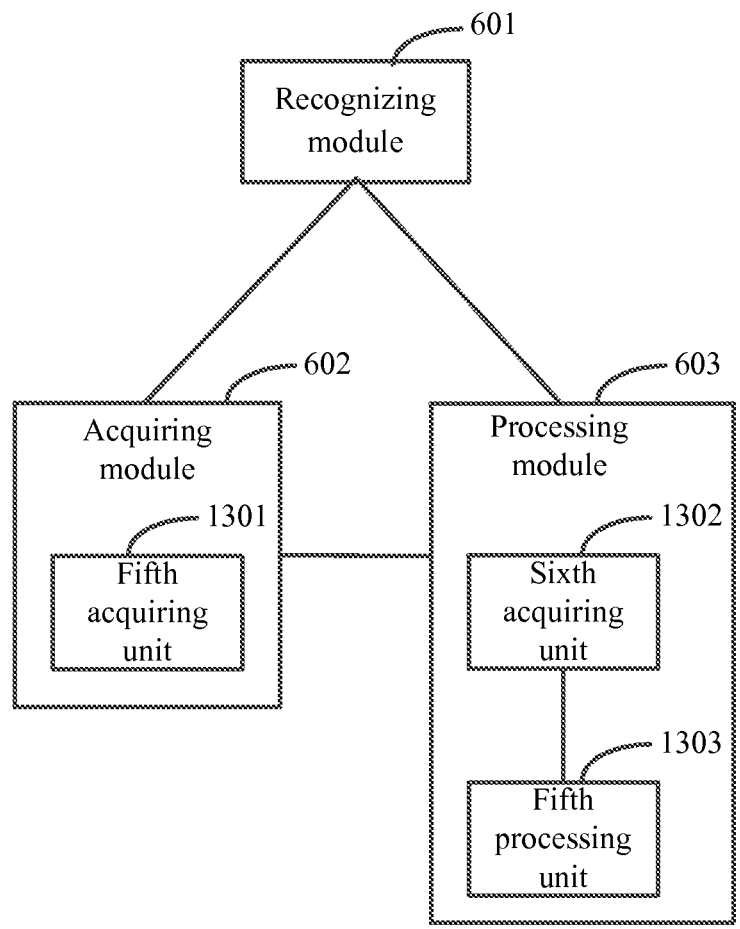
FIG. 13 illustrates an exemplary display showing another detailed structure of an apparatus for processing an image according to an embodiment of the present disclosure.

In one embodiment, as shown in FIG. 13, the above acquiring module 602 may include: a fifth acquiring unit 1301 configured to acquire the age and the gender of a person for each of a plurality of faces respectively according to each of the plurality of faces in the image, when the image contains the plurality of faces.

The above processing module 603 may include: a sixth acquiring unit 1302 configured to acquire a preset cosmetic process mode corresponding to the age and the gender of the person for each of the plurality of faces; and a fifth processing unit 1303 configured to process each of the plurality of faces in the image with the cosmetic process mode corresponding to the age and the gender of the person for each of the plurality of faces.

In one embodiment, the preset cosmetic process mode may include: a preset cosmetic process option and a cosmetic process level regarding the cosmetic process option.

In one embodiment, the preset cosmetic process options may include: whitening, freckle removing, slimming, undereye dark circle removing, eye beautifying, eye brightening or special cosmetic effects, etc.

Figure 14:
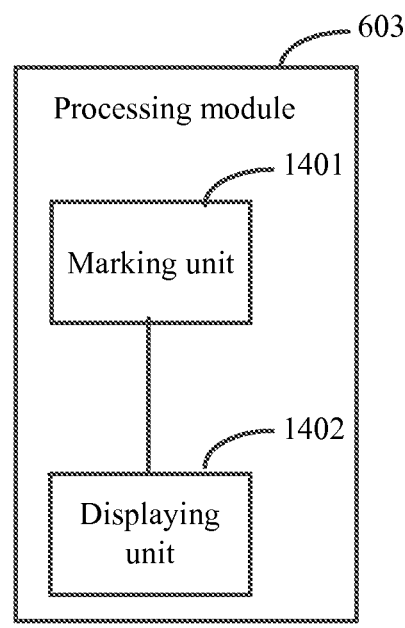
FIG. 14 illustrates an exemplary display showing a fifth detailed structure of a processing module of an apparatus for processing an image according to an embodiment of the present disclosure.

In addition, in one embodiment, as shown in FIG. 14, the above processing module 603 may further include: a marking unit 1401 configured to mark the face in the image with a preset figure; and a displaying unit 1402 configured to display a nickname corresponding to the information of character features at a side of the preset figure.

Figure 15:
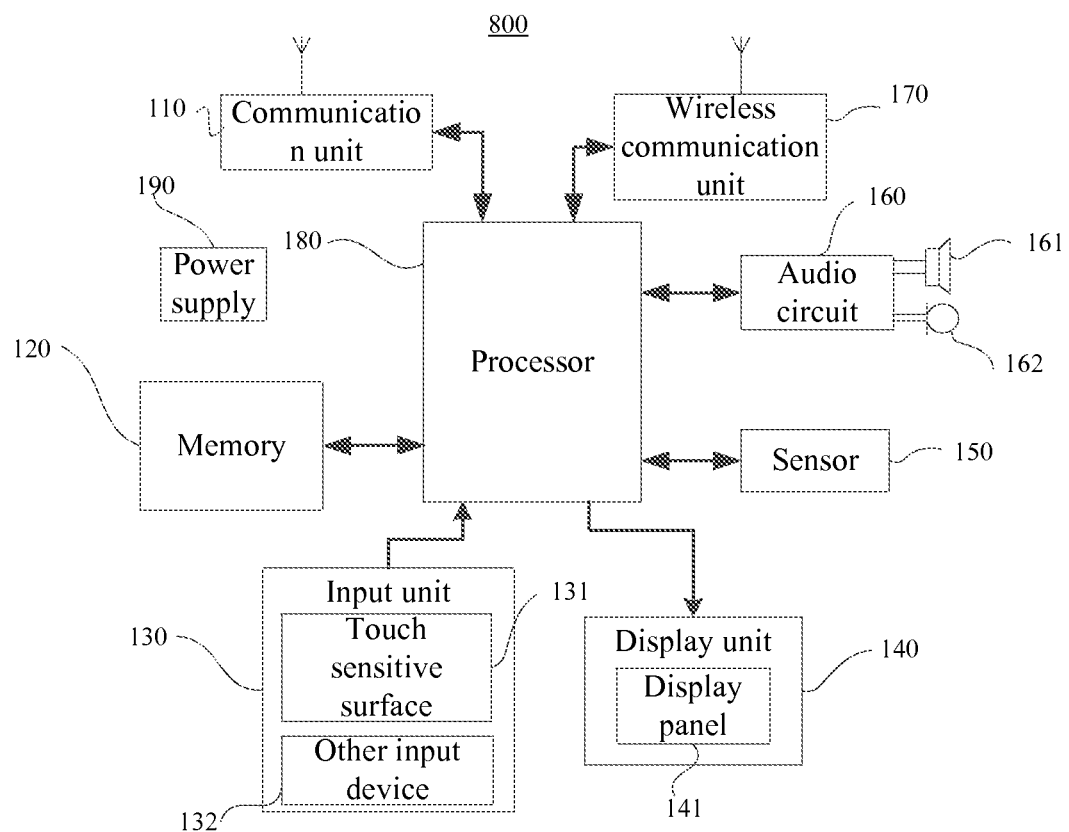
FIG. 15 is illustrates an exemplary display showing a structure of a terminal device according to an embodiment of the present disclosure.

A terminal device is further provided according to an embodiment of the present disclosure. FIG. 15 illustrates an exemplary display showing a structure of a terminal device according to an embodiment of the present disclosure. Referring to FIG. 15, the terminal device may be configured to implement the method for processing an image according to the above embodiments.

The terminal device 800 may include a communication unit 110, a memory 120 including one or more computer-readable storage media, an input unit 130, a display unit 140, a sensor 150, an audio circuit 160, a WiFi (Wireless Fidelity) module 170, a processor 180 including one or more processing cores, and a power supply 190 and other components. It should be appreciated by those skilled in the art that, the structure of the terminal device shown in FIG. 15 does not constitute a limitation to the terminal device, and it may include more or less components than what is illustrated, or combine some of the components, or have different component arrangements.

The communication unit 110 may be configured to transmit and receive information, or to transmit and receive signal during a procedure of calling. The communication unit 110 may be a network communication device such as a RF (Radio Frequency) circuit, a router, a modem, etc. In particular, when the communication unit 110 is a RF circuit, the communication unit 110 receives downlink information from a base station, and then transfers the information to one or more processors 180 to be processed. Also, the communication unit 110 transmits uplink data to the base station. Generally, the RF circuit as a communication unit includes but not limited to an antenna, at least one amplifier, a tuner, one or more oscillators, a subscriber identity module (SIM) card, a transceiver, a coupler, an LNA (Low Noise Amplifier), a duplexer, etc. Furthermore, the communication unit 110 may communicate with a network and other devices through wireless communication. The wireless communication may use any communication standards or protocols, including but not limited to GSM (Global System of Mobile communication), GPRS (General Packet Radio Service), CDMA (Code Division Multiple Access), WCDMA (Wideband Code Division Multiple Access), LTE (Long Term Evolution), e-mail, SMS (Short Messaging Service), etc.

The memory 120 may be configured to store software programs and modules. The processor 180 performs various functional applications and data processing by running the software programs and modules stored in the memory 120. The memory 120 may mainly include a program storage area and a data storage area, wherein the program storage area may store operating systems, application programs required by at least one function (such as a function of sound playback, a function of image playback, etc.), etc.; and the data storage area may store data created during operation of the terminal device 800 (such as audio data, phone book, etc.), etc. In addition, the memory 120 may include a high-speed random access memory and may also include a non-volatile memory. For example, the memory 120 may include at least one disk storage device, a flash memory device, or other volatile solid-state memory devices. Accordingly, the memory 120 may also include a memory controller to provide access to the memory 120 performed by the processor 180 and the input unit 130.

The input unit 130 may be configured to receive input numbers or characters, and generate keyboard, mouse, joystick, optical or trackball input signals related to a user setting and the functional control. The input unit 130 may include a touch sensitive surface 131 and other input device 132. The touch sensitive surface 131, also known as a touch screen or a track pad, may collect user's touch operations on or near the touch sensitive surface 131 (such as an operation performed by users using any suitable object or accessory such as a finger, a touch pen and the like on or near the touch sensitive surface 131), and drive a corresponding connected device according to a preset program. Optionally, the touch sensitive surface 131 may include two parts of a touch detection device and a touch controller. Here, the touch detection device detects a touching position of the user, detects a signal caused by the touch operation, and transmits the signal to the touch controller. The touch controller receives touch information from the touch detection device, transforms it into coordinates of the touch point, and sends the coordinates to the processor 180. The touch controller may also receive a command from the processor 180 and execute the command. In addition, the touch sensitive surface 131 may be realized in various types, such as resistive type, capacitive type, infrared type and surface acoustic wave type, etc. In addition to the touch sensitive surface 131, the input unit 130 may also include other input device 132. The other input device 132 may include but not limited to one or more of a physical keyboard, functional keys (such as volume control keys, switch buttons, etc.), a trackball, a mouse, and a joystick.

The display unit 140 may be configured to display information input by the user or information provided to the user and various graphical user interfaces of the terminal device 800. These graphical user interfaces may consist of graphics, texts, icons, videos, and any combination thereof. The display unit 140 may include a display panel 141, and optionally, the display panel 141 may be configured with LCD (Liquid Crystal Display), OLED (Organic Light-Emitting Diode), etc. Further, the touch sensitive surface 131 may cover the display panel 141. When a touch operation on or near the touch sensitive surface 131 is detected by the touch sensitive surface 131, the touch operation is sent to the processor 180 to determine the type of touch event, and corresponding visual output will be provided on the display panel 141 by the processor 180 according to the type of touch event. Although in FIG. 15, the touch sensitive surface 131 and the display panel 141 are two separate components to realize input and output functions, in some embodiments, the touch sensitive surface 131 and the display panel 141 may be integrated to realize input and output functions.

The terminal device 800 may further include at least one kind of sensor 150, such as a light sensor, a motion sensor and other sensors. The light sensor may include an ambient light sensor and a proximity sensor. Here, the ambient light sensor may adjust the brightness of the display panel 141 according to the brightness of the ambient light. The proximity sensor may turn off the display panel 141 and/or backlight when the terminal device 800 moves close to ear. As one kind of the motion sensor, a gravity acceleration sensor may detect the acceleration in each direction (typically on three axes), and may detect the magnitude and the direction of gravity when it is stationary, which may be used in the applications for recognizing the attitudes of the mobile phone (such as horizontal and vertical screen switching, related games, attitude calibration of a magnetometer), functions related to vibration recognizing (such as a pedometer, clicking), etc. The terminal device 800 may also be equipped with other sensors such as a gyroscope, a barometer, a hygrometer, a thermometer, an infrared sensor, etc., which will not be redundantly described herein.

The audio circuit 160, a speaker 161 and a microphone 162 may provide an audio interface between the user and the terminal device 800. The audio circuit 160 may transform received audio data into electrical signals which are transmitted to the speaker 161 and transformed into sound signals to be output by the speaker 161. On the other hand, the microphone 162 transforms collected sound signals into electrical signals which are received and transformed into audio data by the audio circuit 160. After being output to the processor 180 to be processed, the audio data is transmitted to, for example, another terminal device via the RF circuit 110, or output to the memory 120 for further processing. The audio circuit 160 may also include an ear bud jack to allow a communication between an external earphone and the terminal device 800.

In order to achieve wireless communication, the terminal device may be equipped with a wireless communication unit 170 which may be a WiFi module. WiFi is a short-range wireless transmission technology. The terminal device 800 allows the user to send and receive emails, browse webpages and access streaming media, etc. through the wireless communication unit 170, which provides the user with a wireless broadband Internet access. Although FIG. 15 shows the wireless communication unit 170, it should be understood that, the wireless communication unit 170 is not a necessary component of the terminal device 800, and may be omitted as desired without changing the essential scope of the disclosure.

The processor 180 is a control center of the terminal device 800 that connects various parts of the entire mobile phone through various interfaces and circuits, performs various functions and data processing of the terminal device 800 by running or executing the software programs and/or modules stored in the memory 120 and by invoking data stored in the memory 120, so as to monitor the overall mobile phone. Optionally, the processor 180 may include one or more processing cores. The processor 180 may be integrated with an application processor that mainly processes operating systems, user interfaces and application programs, and a modem processor that mainly processes the wireless communication. It should be understood that, the above modem processor may not be integrated into the processor 180.

The terminal device 800 may also include a power supply 190 (such as a battery) to supply power to each component. The power supply may be logically connected to the processor 180 through a power supply management system, so as to achieve the functions such as charge, discharge and power consumption managements, etc. through the power supply management system. The power supply 190 may also include one or more components of a DC or AC power, a recharge system, a power failure detection circuit, a power converter or an inverter, a power status indicator, etc.

Although not shown, the terminal device 800 may also include a camera, a Bluetooth module, etc., which are not redundantly described herein. In the present embodiment, the terminal device further includes a memory and one or more programs stored in the memory, and the terminal device is configured to execute the one or more programs by one or more processors, the one or more programs containing instructions to perform the following operations: acquiring an image; recognizing a face contained in the image; acquiring information of character features according to the face in the image; processing the image according to the information of character features; and obtaining the processed image.

Optionally, the memory further includes instructions to perform the following operations:

In one embodiment, the information on character features includes one or more categories of an identity, an age or a gender of a person.

In one embodiment, when the information of character features is the identity of a person, processing the image according to the information on character features includes: acquiring a preset cosmetic process mode corresponding to the identity of the person; and processing the image with the cosmetic process mode corresponding to the identity of the person.

In one embodiment, when the information of character features is the age and the gender of a person, processing the image according to the information on character features includes: acquiring a preset cosmetic process mode corresponding to the age and the gender of the person; and processing the image with the cosmetic process mode corresponding to the age and the gender of the person.

In one embodiment, when the information of character features is the age of a person, processing the image according to the information of character features includes: acquiring a preset cosmetic process mode corresponding to the age of the person; and processing the image with the cosmetic process mode corresponding to the age of the person.

In one embodiment, when the information of character features is the gender of a person, processing the image according to the information of character features includes: acquiring a preset cosmetic process mode corresponding to the gender of the person; and processing the image with the cosmetic process mode corresponding to the gender of the person.

When the image contains a plurality of faces, acquiring information of character features according to the faces in the image includes: acquiring the age and the gender of a person for each of the plurality of faces respectively according to each of the plurality of faces in the image. Moreover, processing the image according to the information of character features includes: acquiring a preset cosmetic process mode corresponding to the age and the gender of the person for each of the plurality of faces; and processing each of the plurality of faces in the image with the cosmetic process mode corresponding to the age and the gender of the person for each of the plurality of faces.

In one embodiment, the preset cosmetic process mode includes: a preset cosmetic process option and a cosmetic process level regarding the cosmetic process option.

In one embodiment, the preset cosmetic process options include one or more categories of whitening, freckle removing, slimming, under-eye dark circle removing, eye beautifying, eye brightening and special cosmetic effects.

In one embodiment, the image acquired is an image captured by a camera or an image selected from a picture library.

In one embodiment, the camera is a front camera. Before acquiring an image captured by the front camera, the process method further includes: detecting that the front camera is turned on.

In one embodiment, processing the image according to the information of character features further includes: marking the face in the image with a preset figure; and displaying a nickname corresponding to the information of character features at a side of the preset figure.

In the embodiment of the present disclosure, by automatically recognizing the face in the image, and acquiring the information of character features thereby acquiring a cosmetic process mode corresponding to the information of character features, and then processing the image according to the selected cosmetic process mode, manual setting of cosmetic process parameters can be avoided and the efficiency of image processing can be improved.

It should be understood by those skilled in the art that, the embodiments of this disclosure may be provided as methods, systems or computer program products. Therefore, the disclosure may adopt embodiments in forms of hardware only, software only, or a combination of software and hardware. Furthermore, the disclosure may adopt forms of computer program products implemented on one or more computer usable storage medium (including but not limited to disk storage and optical storage, etc.) containing computer usable program codes.

The disclosure is described with reference to the flowcharts and/or block diagrams of the method, the apparatus and the terminal device to the embodiments of the disclosure. It should be understood that, each process and/or block in the flowcharts and/or block diagrams, and combinations of processes and/or blocks in the flowcharts and/or block diagrams, may be realized by computer program instructions. These computer program instructions may be provided to a general-purpose computer, a special-purpose computer, an embedded processor, or processors of other programmable data processing devices, so as to create a machine, such that a device for realizing functions designated in one or more processes in the flowcharts and/or in one or more blocks in the block diagrams, may be created by instructions executed by processors of a computer or other programmable data processing devices.

These computer program instructions may also be stored in a computer readable storage medium that can boot a computer or other programmable data processing devices to work in a specific way, such that a manufactured product containing an instruction device may be created by the instructions stored in the computer readable storage medium, and the instruction device realizes the functions designated in one or more processes in the flowcharts and/or in one or more blocks in the block diagrams.

These computer program instructions may also be loaded into a computer or other programmable data processing devices, such that a series of operating steps may be performed on the computer or other programmable data processing devices, so as to generate processes realized by the computer, such that steps for realizing the functions designated in one or more processes in the flowcharts and/or in one or more blocks in the block diagrams may be provided by the instructions executed on the computer or other programmable data processing devices.

Apparently, those skilled in the art may make various modifications and variations to the disclosure without departing from the concept and scope of the disclosure. Thus, the disclosure intends to include these modifications and variations provided that they belong to the scope of the claims of the disclosure and the equivalents thereof

What is claimed is:

1. A method for processing an image, comprising:
   acquiring the image, wherein the image contains a plurality of faces;
   recognizing the plurality of faces contained in the image;
   matching the recognized faces with faces prestored in a database;
   retrieving, according to a preset correspondence between information of character features and the faces prestored in the database, information of character features on the recognized faces, wherein the information of character features comprises an age and a gender of a person for each of the plurality of faces respectively;
   acquiring a preset cosmetic process mode corresponding to the retrieved information of character features without manual setting, wherein the preset cosmetic process mode is acquired by querying a corresponding table between a plurality of pieces of information of character features and a plurality of preset cosmetic process modes, and comprises a preset cosmetic process option and a cosmetic process level regarding the cosmetic process option;
   processing each of the plurality of faces in the image with the preset cosmetic process mode corresponding to the age and the gender of the person for each of the plurality of faces respectively; and
   obtaining a processed image.

2. The method according to claim 1, wherein the information of character features comprises one or more categories of an identity, an age and a gender of a person.

3. The method according to claim 2, wherein the information of character features is the identity of the person.

4. The method according to claim 2, wherein the information of character features is the age and the gender of the person.

5. The method according to claim 2, wherein the information of character features is the age of the person.

6. The method according to claim 2, wherein the information of character features is the gender of the person.

7. The method according to claim 1, wherein the preset cosmetic process option comprises one or more options of whitening, freckle removing, slimming, under-eye dark circle removing, eye beautifying, eye brightening and special cosmetic effects.

8. The method according to claim 1, wherein the image is an image captured by a camera or an image selected from a picture library.

9. The method according to claim 1, wherein processing the image with the preset cosmetic process mode further comprises:
   marking the face in the image with a preset figure; and
   displaying a nickname corresponding to the retrieved information of character features at a side of the preset figure.

10. A terminal device for processing an image, comprising:
    a processor; and
    a memory for storing instructions executable by the processor, for performing:
    acquiring the image, wherein the image contains a plurality of faces;
    recognizing the plurality of faces contained in the image;
    matching the recognized faces with faces prestored in a database;
    retrieving, according to a preset correspondence between information of character features and the faces prestored in the database, information of character features on the recognized faces, wherein the information of character features comprises an age and a gender of a person for each of the plurality of faces respectively;
    acquiring a preset cosmetic process mode corresponding to the retrieved information of character features without manual setting, wherein the preset cosmetic process mode is acquired by querying a corresponding table between a plurality of pieces of information of character features and a plurality of preset cosmetic process modes, and comprises a preset cosmetic process option and a cosmetic process level regarding the cosmetic process option;
    processing each of the plurality of faces in the image with the preset cosmetic process mode corresponding to the age and the gender of the person for each of the plurality of faces respectively; and
    obtaining a processed image.

11. The terminal device according to claim 10, wherein the information of character features is an identity of a person.

12. The terminal device according to claim 10, wherein the information of character features is an age and a gender of a person.

13. The terminal device according to claim 10, wherein the information of character features is an age of a person.

14. The terminal device according to claim 10, wherein the information of character features is a gender of a person.

15. The terminal device according to claim 10, wherein the image is an image captured by a camera or an image selected from a picture library.

16. The terminal device according to claim 10, wherein processing the image with the preset cosmetic process mode further comprises:
- marking the face in the image with a preset figure; and
- displaying a nickname corresponding to the information of character features at a side of the preset figure.

17. A non-transitory computer-readable storage medium having stored therein instructions that, when executed by a processor of a terminal device, causes the terminal device to perform a method for processing an image, the method comprising:
- acquiring the image, wherein the image contains a plurality of faces;
- recognizing the plurality of faces contained in the image;
- matching the recognized faces with faces prestored in a database;
- retrieving, according to a preset correspondence between information of character features and the faces prestored in the database, information of character features on the recognized faces, wherein the information of character features comprises an age and a gender of a person for each of the plurality of faces respectively;
- acquiring a preset cosmetic process mode corresponding to the retrieved information of character features without manual setting, wherein the preset cosmetic process mode is acquired by querying a corresponding table between a plurality of pieces of information of character features and a plurality of preset cosmetic process modes, and comprises a preset cosmetic process option and a cosmetic process level regarding the cosmetic process option;
- processing each of the plurality of faces in the image with the preset cosmetic process mode corresponding to the age and the gender of the person for each of the plurality of faces respectively; and
- obtaining a processed image.

* * * * *